United States Patent [19]
Mazur et al.

[11] Patent Number: 6,020,416
[45] Date of Patent: Feb. 1, 2000

[54] AQUEOUS BLENDS OF COLLOIDALLY DISPERSED POLYMERS

[75] Inventors: Stephen Mazur, Wilmington; Gerald Donald Andrews, Hockessin, both of Del.

[73] Assignee: E. I. du Pont de Nemours and Company, Wilmington, Del.

[21] Appl. No.: 09/011,165

[22] PCT Filed: Jul. 31, 1996

[86] PCT No.: PCT/US96/12553

§ 371 Date: Feb. 3, 1998

§ 102(e) Date: Feb. 3, 1998

[87] PCT Pub. No.: WO97/06214

PCT Pub. Date: Feb. 20, 1997

Related U.S. Application Data

[60] Provisional application No. 60/001,808, Aug. 4, 1995.

[51] Int. Cl.[7] .............................. C08J 3/02; C08K 3/20; C08L 33/00
[52] U.S. Cl. .......................... 524/501; 525/222; 525/238; 525/218
[58] Field of Search ............................ 524/501; 525/222, 525/238, 218

[56] References Cited

U.S. PATENT DOCUMENTS

| | | | |
|---|---|---|---|
| 4,567,099 | 1/1986 | Van Gilder et al. | 428/327 |
| 5,166,254 | 11/1992 | Nickle et al. | 524/512 |
| 5,308,890 | 5/1994 | Snyder | 523/201 |
| 5,344,675 | 9/1994 | Snyder | 427/388 |

FOREIGN PATENT DOCUMENTS

| | | | |
|---|---|---|---|
| 0466409 | 4/1991 | European Pat. Off. | C09D 133/02 |

OTHER PUBLICATIONS

L. Dillinger, "Hardness Testing", LECO Corp., 3000 Lakeview Ave., St. Joseph, MI; and, ASTM D 1474–68.

I.M. Ward, *Mechanical Properties of Solid Polymers*, Chapter 12, John Wiley & Sons, London, 1971.

Patent Abstracts of Japan, vol. 012, No. 338 (C–527), Sep. 12, 1988—JP 63099274.

G. Allyn, *Film Forming Compositions*, R. R. Myers & J.S. Long, Ed. Marcel Dekker, NY 1967.

F. Dobler et al., *J. Coll. Poly. Sci.*, 152, 12, 1992.

Sarah T. Eckersley et al., Mechanism of Film Formation From Polymer Latexes, *Journal of Coatings Technology*, 62(780), 89–100, 1990.

R.M. Rynders et al., Characterization of Particle Coalescence in Waterborne Coatings Using Atomic Force Microscopy, *Journal of Coatings Technology*, 67(845), 59–69, 1995.

Z. Hashin et al., A Variational Approach to the Theory of the Elastic Behavior of Multiphase Materials, *J. Mech. Phys. Solids*, 11, 127–141, 1963.

W.D. Harkins, A General Theory of the Mechanism of Emulsion Polymerization, *J. Amer. Chem. Soc.*, 69, 1428–1444, 1947.

*Primary Examiner*—James J. Seidleck
*Assistant Examiner*—U. K Rajguru

[57] ABSTRACT

The invention pertains to aqueous blends of colloidally dispersed polymers for use in making organic coatings which are hard and ductile at ambient temperature, which coatings remain stiff and elastic at temperatures well above their film-formation or drying temperature. In particular, the invention relates to specific combinations or thermoplastic blends of polymers of very high molecular weights. Such blends produce smooth, essentially crack-free coatings when dried conventionally under atmospheric pressure. Such blends are capable of developing the desired balance of properties without conventional amounts of volatile organic coalescing aids and without the need for chemical cure.

9 Claims, No Drawings

AQUEOUS BLENDS OF COLLOIDALLY DISPERSED POLYMERS

This application is a 371 of PCT/US96/12553 filed July 1996, this application also claims the benefit of U.S. Provisional Application No. 60/001,808 filed Aug. 4, 1995.

FIELD OF THE INVENTION

The invention pertains to aqueous blends of colloidally dispersed polymers for use in making organic coatings which are hard and ductile at ambient temperature, and which remain stiff and elastic at temperatures well above their film-formation or drying temperature. In particular, the invention relates to blends of high-molecular-weight, thermoplastic polymers which are capable of developing these mechanical properties without conventional amounts of volatile organic coalescing aids and without the need for chemical cure.

BACKGROUND OF THE INVENTION

The performance of many coatings such as paints are governed by the mechanical properties of one or more organic polymers which serve either as the coating per se or as a binder for other components of the coating, such as pigments and fillers. For use in automotive paints, it is desirable that such polymers be hard at ambient temperature, as illustrated, for example, by a Knoop hardness number (KHN) greater than about 5 MPa (L. Dillinger, "Hardness Testing", LECO Corp., 3000 Lakeview Ave., St. Joseph, Mich.; and ASTM D 1474-68). It is also desirable that such polymers retain a certain degree of stiffness and elasticity at use temperatures of 60° C. or higher, for example, exhibit a Young's modulus (E) greater than 10 MPa Amorphous polymers exhibit such properties only when their glass transition temperature $T_g$ is equal to or greater than the uppermost use temperature. The present invention relates to a new class of coating formulations to achieve these objectives.

Coatings and films are commonly characterized as either brittle or ductile depending upon the manner in which they fail under tensile loads (I. M. Ward, *Mechanical Properties of Solid Polymers*, Chap. 12, John Wiley & Sons, London, 1971). Brittle failure occurs at relatively small strains, for example $\leq 20\%$, following a monotonic increase in the load. By contrast, ductile failure occurs at greater elongations, following a peak in the load/extension curve which is indicative of necking. Highly cross-linked, thermosetting polymer resins are generally brittle, often with elongations<10%, whereas high-molecular-weight, linear thermoplastic polymers typically display a change in failure mode with temperature. At temperatures much below $T_g$ most thermoplastics are brittle, but they undergo a transition from brittle to ductile failure as the temperature is increased, and the temperature of this transition generally increases with increasing strain rate.

Ductility (especially elongations>10%) is a desirable property for coatings on flexible substrates and also for coatings, such as automotive paints, on metals, because ductility contributes to the ability of the coating to survive impacts which dent or bend the substrate without causing cracking or peeling. The present invention provides a means to prepare coatings with a good balance of hardness, ductility, and stiffness, from very high-molecular-weight polymers, without the need for conventionally high amounts of volatile organic components and without the need for cure chemistry.

Aqueous colloidal dispersions of polymers are increasingly important in the paint industry because the coating constituents can be obtained in relatively concentrated form (>20%), at moderate viscosities, and with little or no need for volatile organic solvents which constitute undesirable side-products in paint applications. However, the drying of such dispersions to form uniform, crack-free coatings are subject to certain well-known limitations. Such dispersions have been characterized, in each case, by a minimum film formation temperature, MFT, which is typically a few degrees below the glass transition temperature $T_g$ of the colloidal-polymer particles (See, for example, G. Allyn, *Film Forming Compositions*, R. R. Myers & J. S. Long, Ed., Marcel Dekker, N.Y., 1967). To whatever extent a polymer in a dispersion may be plasticized by other components of the dispersion, the MFT may be reduced accordingly. If a dispersion is dried at a temperature (T) less than the MFT, a multitude of microscopic cracks, so-called "mud-cracks", which destroy the integrity of the coating, tend to develop late in the drying process.

During drying, the actual temperature of an aqueous dispersion may be limited, by evaporative cooling, to a value much less than the temperature of the surrounding atmosphere. Thus, regardless of oven temperature, coating temperatures typically do not exceed about 35° C. under atmospheric pressure, until substantially all of the water has been lost (F. Dobler et al., *J. Coil. Poly. Sci.*, 152, 12 (1992)). This means that dispersions with MFT>35° C. are not generally useful for coating applications. But polymers with unplasticized MFT$\leq 35°$ C. generally do not provide adequate mechanical properties, including hardness at higher temperatures of use.

Two strategies have most commonly been employed to bridge this gap between requirements for film formation and requirements for hard coatings with elevated temperatures of use. First, volatile organic plasticizers (often described as coalescing aids or film formers) have been added to the dispersion. These dissolve in the polymer and lower its $T_g$ during drying, but ultimately volatilize at a later stage of drying, leaving the final resin at a higher $T_g$. This strategy, however, conflicts with economic and environmental motivations to limit the amount of volatile organic content (VOC's) in coating formulations.

A second strategy has been to formulate the dispersion with a low-molecular-weight thermosetting resin which, prior to cure, has sufficiently low $T_g$ to provide film formation. After drying, curing at elevated temperatures, which result in cross-linking and chain extension reactions, raise the $T_g$ and establish the ultimately desired mechanical properties.

In recent years, it has been found that coatings prepared from blends of film-forming and non-film-forming aqueous dispersions of polymer colloids can be prepared with little or no need of a coalescing aid. Friel (EP 0 466 409 A1, Apr. 7, 1991) has shown that dispersion blends of a "soft emulsion polymer" with $T_g < 20°$ C., at 20 to 60% by weight, in combination with a second "hard emulsion polymer" with $T_g > 20°$ C. exhibit MFT's $\leq 9.35°$ C., without the need for a coalescing aid. All cited examples, however, exhibited hardnesses of KHN$\leq 2.7$ MPa.

Snyder (U.S. Pat. No. 5,344,675, Sep. 6, 1994; U.S. Pat. No. 5,308,890, May 3, 1994) has shown that blends of a film-forming dispersion of a "multi-stage" latex polymer and a second non-film-forming dispersion can be used to form coatings without the need for a coalescing aid. Snyder specifies that each latex particle in the "multi-stage" component must contain between 50 and 95% by weight of a polymer with $T_g<50°$ C. and a second polymer of higher $T_g$. A certain balance was achieved between coating hardness, impact resistance and flexibility. The '890 patent also states at column 3, lines 25–30, that "a comparable balance of these properties cannot be obtained by the use of other types of systems, such as, for example, a random copolymer, simple blends of conventional emulsion polymers, a single type of multi-stage polymer, and the like." Among the examples cited for coatings made without a coalescing aid, three have a KHN>5.5 MPa, but these are characterized by a reverse impact resistance<2 inch-pounds and a flexibility corresponding to mandrel flexibility of ½". (According to ASTM D 1737-62, a mandrel bend of ½" is approximately equivalent to a tensile elongation of 6.8%). Further examples are cited with a KHN between 4.0 and 5.5 MPa, but with an impact resistances ranging from 4 to 60 inch-pounds and a mandrel flexibility of ½" to ³⁄₁₆".

BRIEF DESCRIPTION OF THE INVENTION

The invention pertains to an aqueous dispersion comprising a blend of polymer components each in the form of colloidal particles having average hydrodynamic diameters less than about 1000 nm and preferably less than about 200 nm, said polymer components comprising:

a first polymer component comprising about 20% to about 50% by volume of the total polymeric content and exhibiting a measured $T_g(I)$ of greater than or equal to 49° C.;

a second polymer component comprising about 45% to about 80% by volume of the total polymeric content and exhibiting a measured $T_g(II)$ less than 49° C. and greater than 24° C.; and a third polymer component comprising 0% to about 35% by volume of the total polymeric content and exhibiting a measured $T_g(III)$ less than 24° C.;

the sum of all three polymer components being 100% by volume;

wherein said first, second, and third polymer components each have a $M_w$ greater than about 80,000 Daltons and are mutually adherent; and wherein the aqueous dispersion has a volatile organic content (VOC) of less than about 20% by weight of the total polymeric content.

The invention further pertains to an aqueous dispersion which, upon drying at atmospheric pressure at temperatures greater than or equal to 35° C. and annealing at temperatures greater than $T_g(I)$, a continuous, homogeneous coating is formed, which coating is characterized by a balance of hardness, ductility and stiffness at temperatures above $T_g(II)$, which properties are represented, respectively, by a KHN≧about 3 MPa at 24° C., preferably by KHN≧5 MPa at 24° C., tensile elongations greater than or equal to about 20%, and retained storage modulus, E' (1 Hz)>about 10 MPa at $T=[T_g(I)+T_g(II)]/2$; and wherein said properties are achievable without requiring, during drying or annealing, the cross-linking or branching of the molecular chains of said polymeric components to sensibly increase the molecular weights of said polymeric components.

In addition to polymer, the dispersion blends of the present invention may contain other constituents, including pigments, salts, surfactants, and UV stabilizers or inhibitors.

The invention further pertains to a clearcoat or colorcoat composition comprising about 10 weight % to about 50 weight % of polymeric binder solids, said binder solids comprising about 30 weight% to about 100 weight % of the aqueous dispersion described above. Such coating compositions, when dried, are capable of forming dense, crack-free films for use on automotive and other substrates.

DETAILS OF THE INVENTION

Dispersion blends of the present invention have utility in producing hard organic coatings such as paints. For such applications, the dispersion blend may be mixed with other functional components such as pigments, fillers, or reagents for rheology modification, etc., as will be understood by the skilled artisan. Such additional materials may either enhance or compromise certain properties of the final coating. It shall, therefore, be understood that those physical properties exemplified by, and claimed for, coatings derived from the polymer dispersion blends of the present invention, containing essentially no other dispersed materials or solids, represent a starting point from which the inclusion of other material may result in further improvement or mitigation, depending on the total properties of the final composition.

The dispersion blends claimed in this invention form dense, essentially crack-free, hard, ductile organic coatings when dried at atmospheric pressure and temperatures≧about 40° C. and subsequently annealed at temperatures greater than the highest $T_g$, namely $T_g(I)$. Said coatings remain stiff and elastic at temperatures well above the film-forming or drying temperature without a requirement for cure, which is to say without any chemical bond-forming reactions to increase $M_w$ or cross-link the polymers.

An example of the combination of properties which can be achieved from a binary blend according to the present invention, is disclosed in Example 44 (blend 50) below. A Type I polymer with $T_g(I)=90°$ C. was blended with a Type II polymer of $T_g(II)=34°$ C., resulting in a Knoop hardness number (KHN) of 12 MPa, a Young's modulus (E) of 1.7 GPa, a tensile elongation ($e_{max}$) of 46%, an impact resistance of 50 inch-pounds (0.434 kg-m, 4.26 joule), a mandrel flexibility<⅛" (0.32 cm), and at a temperature of 62° C. (midway between the two $T_g$'s), a retained storage modulus (E') of 0.31 GPa.

The present blends, depending on the particular embodiment, may or may not include multistage polymer latex particles. Such particles are predominantly amorphous, and dispersions of such particles are most commonly prepared directly by free-radical, emulsion polymerization, in water, of unsaturated monomers such as acrylic acid (AA), methacrylic acid (MAA) and their respective esters or amides, including but not limited to butyl methacrylate (BMA), butyl acrylate (BA), ethyl acrylate (EA), 2-methoxyethyl acrylate (MeOEA), 2-ethyl hexyl methylacrylate (EHMA) and methyl methacrylate (MMA), acrylonitrile, vinyl or vinylidene halides, vinyl acetate, vinylpyridine, N-vinylpyrrolidone, styrene (Sty), 2-propenoic acid, 2-methyl,2-(2-oxo-l-imidazolidone) ethyl ester, etc.; but may also be prepared by dispersing, in water, polymers which have been first polymerized neat or in solution by condensation reactions or by addition reactions other than those initiated by free radicals. See J. C. Padget, J. *Coatings Techn.*, 66, p. 89 (1994) and D. C. Blackley, *Emulsion Polymerization*, Applied Science Publ. Ltd., London 1975. In order that the dispersions of the invention be stable with respect to sedimentation and/or flocculation, the colloidal particles are typically stabilized by some combination of ionic functional groups on the polymer surface and/or surfactants adsorbed on their surface, and/or by low ionic strength of the aqueous phase.

The dispersion blends of this invention are further characterized by the fact that the different polymers in the blend remain phase separated following drying and annealing, at temperatures above the highest glass temperature $T_g(I)$, such that the resulting material exhibits two (or more) glass temperatures, for example, with respect to its thermomechanical properties (N. G. McCrum, B. E. Read, & G. Williams, *Anelastic and Dielectric Effects in Polymeric Solids*, Dover Publ., N.Y., 1991).

The blends of this invention are further distinguished by the development, during annealing, of mechanically strong interfaces between the distinct polymer phases making them "mutually adherent." By "mutually adherent," with respect to polymer components of a dispersion blend, is meant that, after lamination and annealing of films made from the polymeric components, it is not possible to peel or separate the films along their original interface.

As illustrated in the examples, the three types of polymers I, II, and III described herein serve different functions in the invention in terms of their film-forming abilities and their effects on the mechanical properties of a coating made therefrom. Colloidal dispersions of Type II and/or III polymers alone are capable of forming dense, crack-free coatings on drying at temperatures $\geq 40°$ C. in the absence of any coalescing aid. Dispersions of Type I alone cannot form such coatings without addition of some plasticizer as a coalescing aid, because their MFT is otherwise too high. Types I or II can provide coatings which are hard (KHN>3) at ambient temperature (24° C.), because their $T_g$ exceeds this temperature. However, in blends among the three types of dispersions, it was found that that those for which the polymer weight comprises $\leq 50\%$ of Type I can form dense, essentially crack-free film in the absence of, or with less than conventional amounts of, one or more organic coalescing aids or agents. Conventional amounts of coalescing agents are typically about 25% by weight of total polymeric content, resulting in a relatively higher VOC (Volatile Organic Content). In contrast, the present invention comprises less than about 20% VOC, preferably less than 10% VOC, and most preferably less than 5% VOC, as measured by heating a coating or other composition to 105° C. for 20 minutes and determining the weight of material that is volatilized. See EPA (U.S. Environmental Protection Agency) Reference Method 24 and ASTM D-3960.

In blends according to the present invention, the ratio of Type II to Type III polymers may be further adjusted to obtain desired mechanical properties of the final coating. For example, as illustrated in Example 49 below, when the polymer weight comprises<40% Type III, the coating will exhibit a KHN$\geq$about 3 MPa.

The $T_g$'s of the components of the blends may be achieved with or without the addition of a non-volatile plasticizing agent to those polymers whose intrinsic $T_g$ is higher than specified. Accordingly, the relevant $T_g$'s of the components of a mixture are the resulting $T_g$'s as measured by a DSC of the mixture.

Type I polymers have the highest $T_g$. This determines the maximum temperature at which the coating may exhibit a certain degree of stiffness and elasticity, for example a storage modulus E'>0.01 GPa, at a frequency of 1 Hz. The exact magnitude of E' depends upon the weight fraction of the Type I polymer, such that higher fractions provide a higher E'. As illustrated by Example 44 (B-50) below and Table 8, a blend containing 50% of a Type I polymer may exhibit a value of E' at temperatures between $T_g(I)$ and $T_g(II)$ very close to the maximum value theoretically attainable from an isotropic blend of the pure components (Z. Hashin & S. Shtrikmann, *J. Mech. Phys. Sol*, 11, 127 (1963)).

The coatings are preferably annealed at a temperature well above the highest $T_g$, mamely $T_g(I)$, in order to obtain optimum mechanical properties. In the examples described below, annealing was for 20 minutes at 130° C. Without annealing, the dried coatings prepared from dispersion blends of the invention were found to be too brittle, as characterized by elongations<10% and no necking under tension. The effects of annealing are thought to involve some combination of the following processes: (1) secondary coalescence of the Type I particles, involving growth of mutual interfaces and diffusion of chains across those interfaces, (2) relaxation of elastic stresses within the Type II phase domains and increasing inter diffusion in these domains which comprise a continuous network, and (3) a limited degree of inter diffusion between Type I and Type II phase domains which strengthens these heterogeneous interfaces. (See, for example, S. Voyutsky, *Autohesion and Adhesion of High Polymers*, Wiley-Interscience, N.Y., 1963)

An important aspect of this invention is the discovery that the ductility of the coatings derived from dispersion blends depends critically upon the interfaces between the different polymer phase domains. Examples in Tables 6, 7 and 10 show that films prepared from dispersion blends containing types I, II, and III, in proportions described by the invention, show good ductility. For example blends of P(MMA/BA) Type I with P(MMA/EA) Type II in Table 6 exhibit necking and high elongations characteristic of a tough, ductile material. Table 10 shows similar results for blends of P(MMA/BMA) Type I with P(BMA) Type II.

For the purposes of this invention, the mutual adherence between any two polymers, for example of Types I and II, may be evaluated according to the following test. Independent films, with thicknesses greater than about 20 µm, of each polymer are prepared by a method such as drying of the polymer dispersion, casting a film from solution, or compression molding a film from a dried polymer powder. Specimens of each film are then laminated together, under pressure (e.g., 100 MPa), at a temperature of at least 40° C. above the higher $T_g$, represented by $T_g(I)$, for a period of at least 20 minutes, so as to create an area of intimate molecular contact. This area can be any convenient size, e.g., 2 cm by 10 cm. The laminated specimen is then allowed to cool to ambient temperature (e.g., 24° C.) and an attempt is made to separate the two components by peeling along the original interface.

When the interfacial strength in such a laminate is less than the cohesive fracture strength of either polymer tested, e.g., Type I, Type II or Type III, then it is possible to cleanly peel or separate the two components, which is to say the laminate fails adhesively. Alternatively, if the mutual adhesive strength is comparable to the cohesive strength of either component then it is no longer possible to mechanically peel or separate the polymer films along their original interface. Instead, the sample will typically fail cohesively by fracturing or tearing through the thickness of one or both components. Cohesive and adhesive strengths may be quantitatively characterized by the critical energy release rate, G, as described in *Fracture Mechanics of Polymers*, by J. G. Williams, Ellis and Horwood, Ltd., West Sussex, England, 1984. However, for present purposes, the simple qualitative distinction between cohesive failure and adhesive failure of these laminates is sufficient to determine whether such a pair is mutually adherent or non-adherent. Thus, mutual adherence between a given pair of polymers, measured in this way, is a reliable indicator of the ductility of coatings and films which may be prepared from drying and annealing of aqueous colloidal dispersions of the same two polymers, as disclosed in this invention.

In particular, when an aqueous dispersion of colloidal polymers of Type I and Type II (or II and III, or I and III), containing less than about 20%, preferably less than 10%, most preferably less than 5%, volatile organic content by weight of total polymeric content, is dried and annealed at a temperature at least 40° C. higher than the highest $T_g$ for a period of at least 20 minutes, the resulting film may exhibit, at 24° C., a tensile failure which is either brittle (e.g., with elongations less than 10% with no significant yielding) or ductile (e.g., with elongations greater than 10%, accompanied by yielding or necking). As illustrated by examples in Tables 7 and 10, ductile failure is observed in every case where the polymer pairs are mutually adherent, and brittle failure is observed when they are not mutually adherent. Similiarly, Example 55 may be characterized as marginally adherent since the laminates fail by a combination of adherent and cohesive modes. The corresponding blends (Examples 67–70) exhibit tensile failures ranging from brittle to ductile, depending upon the blend composition.

Polymer-polymer compatibility plays an important role in blends of this invention. Coatings fabricated from the dispersion blends of the invention remain chemically heterogeneous, each component polymer remaining in different phase domains as can be distinguished by such methods as electron microscopy and by various manifestations of multiple glass transition temperatures, for example, in dynamic mechanical measurements. This heterogeneity may be the result of true immiscibility of the component polymers in the thermodynamic sense of equilibrium phase separation. Or it may be that the polymers are actually thermodynamically miscible under the processing conditions but, on account of their high molecular weights, they remain phase segregated for kinetic reasons. Thus, for $M_w \geqq 80,000$ daltons, it would take extremely long times for diffusion to achieve complete mixing of a mutually compatible pair. However, it may be noted that for very high $M_w$, the vast majority of polymer pairs, even copolymers which differ in the proportion of comonomers, are, in fact, thermodynamically immiscible.

Pairs of acrylic polymers which exhibit a strong interface (as exemplified by cohesive failure of laminates and formation of ductile blends) often contain a common comonomer. It may be that this common structural element imparts a limited degree of thermodynamic compatibility, for example, similar solubility coefficients for the two copolymers, such that a limited degree of inter diffusion may occur which strengthens the interface. Examples in Tables 6, 7 and 10 below illustrate the correlation of ductility with the presence of a common comonomer in both components of a binary blend. In Table 6 below, the common comonomer is methyl methacrylate, and in Table 10, it is butyl methacrylate. Note that for 50/50 blends in Table 10, only marginal ductility is obtained when the common comonomer comprises only 25% of the Type I component.

Coating properties obtained from the dispersion blends of the invention, especially the balance of properties, and most especially the combination of ductility with KHN>5 MPa, represent substantial improvements over the prior art as disclosed by the examples of Friel, in EP 0 466 409 A1, Apr. 7, 1991, and of Snyder, in U.S. Pat. Nos. 5,344,675; 5,308, 890, referred to above. Moreover, this balance of properties is especially unobvious in that they can be obtained from simple emulsion polymers, not only multi-stage polymers, in contradiction to Snyder's teaching.

The aqueous colloidal copolymer dispersions of the present invention can be made in various ways known to those skilled in the art. Although not wishing to be limited to the following methods, all dispersions in the examples below were made by standard batch emulsion polymerization. using sodium dodecylsuflate (SDS, 0.1 to 1.0 mole percent based on monomer) or other material as identified below as surfactant, and ammonium persulfate (APS) initiator. Polymerizations were run to completion under monomer-starved conditions at around 33% solids.

EXAMPLES

The general procedure for producing the polymers employed in this invention is as follows. All monomers, initiators, and surfactants including SDS, dioctyl sulfosuccinate (DOSS), and the ammonium salt of nonylphenol ethoxylate sulfate (Ipegal® CO-425), are commercially available (Aldrich Chemical Co., Milwaukee, Wis.) and were used as received.

A 2-L resin kettle (4-L for the 800 g reactions) equipped with a condenser, addition funnel, mechanical stirrer, and temperature controller probe was charged with the water required to produce 33 wt % solids, less 100 ml, and SDS. The contents were stirred and heated to 80° C. until all the SDS dispersed. The APS was dissolved in 100 ml water, and 80 ml of this solution was added to the kettle. All of the monomers except the MAA (if used) were mixed and divided into two equal portions. One portion of the monomers was charged to the addition funnel, and about 20 ml was added to the kettle. The remainder was added dropwise over about ½ hour, keeping the temperature in the kettle between 80 and 85° C. The MAA (if used in the particular Example) was mixed with the second half of monomer, which was charged to the addition funnel and added slowly over 1 hour, keeping the temperature in the kettle between 80 and 85° C. After the addition, the remaining persulfate solution was added, and the latex heated for ½ hour at 85° C. The latex was then heated to boiling until no more monomer appeared in the condenser. The latex was then cooled and filtered through a fine paint strainer.

The resulting dispersions were stable, cloudy, with Brookfield viscosities ranging from 5 to 10 poise (0.5–1.0 Pasec). A 10 g latex sample was poured into a 5 cm round aluminum pan which was then placed in a 75° C. vacuum oven at about 400 mm Hg vacuum overnight. Solids content, differential scanning calorinetry (DSC), and gel permeation chromatography (GPC) measurements were made on this dried material, as described below.

The $T_g$ values reported are mid-point temperatures in degrees Celsius from DSC scans recorded according to ASTM D3418-82. Temperature dependence of the mechanical properties was characterized by DMA, performed on a commercially available instrument (Model DMA-7®, Perkin-Elmer, Norwalk, Conn.). Specimens of free-standing film (e.g., 0.06×4×10 mm) were mounted between parallel clamps at a static tension of 20 mN, and subjected to sinusoidal dynamic stress of 10 mN amplitude at a frequency of 1.0 Hz. The storage modulus, E', was measured as the sample was heated from −20° C. to 90° C. at 5° C./min.

Molecular weights were measured by GPC. The equipment employed consisted of the following. Columns: 2 pl gel 5 μm mixed c, 300 mm×7.5 mm (Polymer Labs, Amherst, Mass., part# 1110.6500); Detector: Waters 410® refractive-index detector (Waters, Inc., Milford, Mass.); Pump: Waters 590® (Waters, Inc., Milford, Mass.); and Column Heater (Waters, Inc., Milford, Mass.).

The refractive-index detector internal temperature was 30° C.; solvent, tetrahydroflran (THF), 0.025% butylated hydroxytoluene (BHT) inhibited (Omnisolv); Flow rate, 1 ml/min; Concentration, 0.1% (10 mg(10 ml). Samples were prepared by dissolving overnight with gentle shaking, and then filtering through 0.5 µm filter (Millipore, Bedford, Mass.).

Hydrodynamic diameters (particle size) of the polymeric particles were determined by quasielastic light scattering in the range from about 50 to 150 nm, using a Brookhaven Instruments BI-90® instrument (Brookhaven Instruments, Brookhaven, N.Y.). See generally *Paint and Surface Coatings: Theory and Practice*, ed. by R. Lambourne, Ellis Horwood Ltd., West Sussex, England, 1987, pp. 296–299, and *The Application of Laser Light Scattering to the Study of Biological Motion*, ed. by J. C. Earnshaw and M. W. Steer, Plenum Press, N.Y., 1983, pp. 53–76.

Coatings were prepared by casting or spraying the dispersion onto flat substrates (glass or metal), drying in a temperature-controlled oven at atmospheric pressure (generally at 80° C.), followed by annealing at a higher temperature above $T_g(I)$ (generally 130° C.). For spray applications, an anti-foaming agent such as 2,3,7,9-tetramethyl-5-decyne4,7-diol (Surfynol-104®, Air Products and Chemicals, Inc., Allentown, Pa.) was added to the dispersion at less than 2% of solids. This had no detectable plasticizing or film-formation effect. Film formation was evaluated after drying and after annealing. In particular, the formation of micro-cracks which penetrate the entire thickness of the coating ("mud-cracks") was noted as unacceptable film formation.

Hardness measurements were made on coatings 0.001 to 0.003" (0.00254 to 0.00762 cm) thick on glass substrates at temperatures between 21° C. and 24° C. at ambient by means of a commercially available microindentation instrument (LECO Corp., St. Joseph, Mich., part number M-400-G1). Free-standing films were prepared from coatings cast on glass plates.

The dispersions of these copolymers were generally evaluated from draw-downs (0.005 to 0.015 inches, 0.0127 to 0.0381 cm) on glass, with subsequent drying in air at 70° C. for 10 minutes, and annealing at 130° C. for 20 minutes. Final coating thickness was about 0.001 to 0.0025 inches (0.00254 to 0.00635 cm). All the film thicknesses were measured with a micrometer. This protocol closely resembles typical drying and cure cycles for thermoset coatings.

The mechanical properties of binary blends were evaluated at ambient temperature and humidity (e.g., 23° C., 50% relative humidity or RH) both for free-standing films (0.0025", 0.00635 cm, thick) and for coatings (0.001", 0.00254 cm, thick) applied on primed steel panels (cold rolled steel with C168 conversion and ED5000 primer, ACT Laboratories, Troy, Mich.). All samples were first dried at 80° C. for 5 minutes and annealed at 130° C. for 20 minutes.

Tensile testing ((Instron, Canton, Mass., part number MTAOPR66) was performed on film specimens 50 to 100 µm thick (0.002 to 0.004 inches), 6.25 mm (0.25 inches) wide with 2.5 cm (1 inch) gauge lengths, at a strain rate of 0.017/sec at temperatures between 22° C. and 24° C., and at a cross-head speed of 2.5 cm/minute (1 in/min). Impact tests were performed with a drop tower equipped with 1.56 cm (0.625 in) die and 1.25 cm (0.5 in) hemispherical indenter (ASTM D2794). Impact performance was comparable regardless of whether the coated surface was on the same or opposite side of the impact. Mandrel bends were performed with a conical mandrel (Gardner, Pompano Beach, Fla., MN-CM/ASTM, ASTM D522) representing diameters from 3.13 to 3.75 cm (⅛ to 1.5 in).

EXAMPLES 1–37

Examples 1–37 illustrate the synthesis of the different types of copolymers for use in blends of the present invention. The general method as previously described was followed. Tables 1, 2 and 3 below report the results of representative latex procedures. In the tables, "Size" refers to the grams of monomer used; "Soap" is the moles of surfactant (SDS unless otherwise noted) per mole of monomer, presuming the molecular weight is 100; APS is in grams; the proportions of monomer are in weight %; and $M_n$ and $M_w$ are in thousands.

TABLE 1

(Type 1 Copolymers)

| Ex. No. | Size† | Soap‡ | APS (g) | MMA | BMA | EA | BA | Sty | MAA | Part. Size nm | Tg° C. | Mn × 10⁻³ | Mw × 10⁻³ |
|---|---|---|---|---|---|---|---|---|---|---|---|---|---|
| 1 | 200 | 0.0070 | 0.4 | 74.0 | | 25.0 | | | 1.0 | | 71 | 150 | 517 |
| 2 | 200 | 0.0053 | 0.4 | 98.0 | | | | | 2.0 | | 114 | 191 | 467 |
| 3 | 400 | 0.0042 | 1.0 | 98.0 | | | | | 2.0 | | 124 | 303 | 728 |
| 4 | 400 | 0.0042 | 1.0 | 98.0 | | | | | 2.0 | | 118 | 130 | 603 |
| 5 | 200 | 0.0070 | 0.2 | 78.0 | | 20.0 | | | 2.0 | | 80 | 194 | 628 |
| 6 | 200 | 0.0053 | 0.4 | 98.0 | | | | | 2.0 | | 124 | 131 | 399 |
| 7 | 200 | 0.0070 | 0.4 | 83.0 | | | 15.0 | | 2.0 | | 90 | 185 | 555 |
| 8 | 200 | 0.0094 | 0.4 | 84.0 | | | 15.0 | | 1.0 | | 90 | 152 | 428 |
| 9 | 200 | 0.0070 | 0.4 | 85.0 | | | 15.0 | | | 57.0 | 82 | 169 | 475 |
| 10 | 400 | 0.0052 | 0.4 | 85.0 | | | 15.0 | | | | 81 | 216 | 698 |
| 11 | 400 | 0.0042 | 0.4 | 84.0 | | | 15.0 | | 1.0 | 70.0 | 89 | 223 | 676 |
| 12 | 800 | 0.0042 | 0.4 | 84.0 | | | 15.0 | | 1.0 | 73.0 | 90 | 418 | 940 |
| 13* | 200 | 0.0025 | 0.4 | 84.0 | | | 15.0 | | 1.0 | 91.0 | 100 | 234 | 891 |
| 14 | 800 | 0.0042 | 0.4 | 84.0 | | | 15.0 | | 1.0 | | 86 | 334 | 852 |
| 15 | 200 | 0.0070 | 0.4 | 50.0 | 50.0 | | | | | | 69 | 267 | 1100 |
| 16 | 200 | 0.0035 | 0.4 | 75.0 | 25.0 | | | | | | 98 | 186 | 536 |
| 17 | 200 | 0.0018 | 0.4 | 64.0 | | | 15.0 | 20.0 | 1.0 | | 83 | 192 | 608 |
| 17-1 | 200 | 0.0018 | 0.4 | 99.0 | | | | | 1.0 | 84.0 | 66 | 155 | 414 |

*Soap is Ipegal ® CO-425
†Size = g. of monomer used
‡Soap = moles surfactant/mole monomer

TABLE 2

(Type 2 Copolymers)

| Ex. No. | Size† | Soap‡ | APS g | MMA | BMA | EA | MeOEA | Sty | MMA | Part Size nm | Tg °C. | Mn × 10⁻³ | Mw × 10⁻³ |
|---|---|---|---|---|---|---|---|---|---|---|---|---|---|
| 18 | 200 | 0.0070 | 0.4 | 58.0 | | 15.0 | 25.0 | | 2.0 | | 42 | 159 | 838 |
| 19 | 200 | 0.0053 | 0.4 | 56.0 | | 15.0 | 25.0 | | 4.0 | | 42 | 159 | 750 |
| 20 | 200 | 0.0053 | 0.4 | 58.0 | | 15.0 | 25.0 | | 2.0 | | 40 | 193 | 929 |
| 21 | 200 | 0.0042 | 0.4 | 58.0 | | 40.0 | | | 2.0 | | 49 | 232 | 833 |
| 22 | 200 | 0.0042 | 0.4 | 48.0 | | 50.0 | | | 2.0 | | 34 | 178 | 855 |
| 23 | 200 | 0.0042 | 0.4 | 50.0 | | 50.0 | | | | 57.0 | 30 | 303 | 1200 |
| 24 | 400 | 0.0042 | 0.4 | 50.0 | | 50.0 | | | | | 30 | 221 | 1110 |
| 25 | 400 | 0.0042 | 0.4 | 49.0 | | 50.0 | | | 1.0 | 73.0 | 36 | 268 | 1100 |
| 26 | 800 | 0.0042 | 0.4 | 49.0 | | 50.0 | | | 1.0 | 76.0 | 33 | 402 | 1530 |
| 27* | 200 | 0.0025 | 0.4 | 49.0 | | 50.0 | | | 1.0 | 75.0 | 33 | 242 | 1090 |
| 28 | 200 | 0.0021 | 0.4 | 49.0 | | 50.0 | | | 1.0 | 71.0 | 33 | 253 | 992 |
| 29 | 200 | 0.0021 | 0.4 | 49.0 | | 50.0 | | | 1.0 | 70.0 | 34 | 299 | 1090 |
| 30** | 200 | 0.0021 | 1.0 | 49.0 | | 50.0 | | | 1.0 | 74.0 | 34 | 178 | 802 |
| 31 | 200 | 0.0070 | 0.4 | | 100.0 | | | | | 54.0 | 30 | 375 | 1360 |
| 32 | 800 | 0.0042 | 0.4 | 49.0 | | 50.0 | | | 1.0 | | 32 | 432 | 1390 |
| 33 | 200 | 0.0018 | 0.4 | 46.0 | | 50.0 | | | 4.0 | | 35 | 217 | 869 |
| 34 | 200 | 0.0018 | 0.4 | 29.0 | | 50.0 | | 20.0 | 1.0 | | | | |
| 34-1 | 200 | 0.0018 | 0.4 | 74.0 | 25.0 | | | | 1.0 | 95.0 | 29 | 136 | 344 |

*Soap is Ipegal CO-425
**Soap is DOSS
†Size = g. of monomer used
‡Soap = moles surfactant/mole monomer

TABLE 3

(Type 3 Copolymers)

| Ex. No. | Size† | Soap‡ | APS g | MMA | EHMA | EA | MeOEA | BA | MAA | Tg °C. | Mn × 10⁻³ | Mw × 10⁻³ |
|---|---|---|---|---|---|---|---|---|---|---|---|---|
| 35 | 200 | 0.0042 | 0.4 | 24.0 | | 50.0 | 25.0 | | 1.0 | −1 | 84 | 297 |
| 36 | 200 | 0.0094 | 0.4 | 22.0 | | | | 77.0 | 1.0 | −24 | 233 | 1090 |
| 37 | 200 | 0.0094 | 0.3 | | 100.0 | | | | | −5 | 445 | 1410 |

†Size = g. of monomer used
‡Soap = moles surfactant/mole monomer

EXAMPLE 38

This Example illustrates the blending of copolymers and the effects of blending on film formation in the absence of plasticizers. The following components were mixed in a test tube with vigorous stirring: 1.0 ml P(MMA/EA/MeOEA/MAA) (Example 18 from Table 2, $T_g$ 42° C.), 0.10 ml of phenyltrumethylarmonium hydroxide, (PTMAOH), (0.42 molar in deionized water), and 1.0 ml of P(MMA/EA/MAA) (Example 1 from Table 1, $T_g$ 71° C.). The resulting dispersion was fluid, moderately viscous and stable over 20 minutes with no evidence of flocculation. A coating was drawn onto a glass microscope slide (2"×3", 5.01 to 7.162 cm) by means of a doctor blade (clearance 0.015", 0.0381 cm) and then dried in an oven at 130° C. at atmospheric pressure for 20 minutes. The resulting coating appeared optically clear with no cracks and no evidence of exuded surfactant. The coated surface was hydrophobic and homogeneous as characterized by advancing and receding contact angles of 43° and 30° respectively. The hardness was KHN=10.4 MPa.

EXAMPLES 39–46

These Examples illustrate binary blends of a Type I polymer with Type II or III polymers. In order to determine the maximum fraction of Type I polymer in blends which could be dry without plasticizer into crack-free coatings, blends similar to Example 38 were prepared. Films were cast and dried as in Example 38. All samples were dried at 80° C./5 minutes followed by drying at 130° C. for 20 minutes. In those examples with pH>6, methacrylic acid residues on the polymer were neutralized with either phenyltrimethyl ammonium hydroxide (Aldrich Chemical Co., Milwaukee, Wis.) or triethanolamine (Aldrich Chemical Co., Milwaukee, Wis.). Table 4 below indicates the ranges of film forming composition and hardnesses for various binary dispersion blends, with compositions based on weight % solids.

As shown in Table 4, all the binary and ternary blends containing more that 55% of Type I polymer were found unsuitable for film formation in the absence of added plasticizers due to crack formation during drying. (Comparative Examples are indicated "Comp." in Table 4.) This supports the theory that if the percentage of high $T_g$ (Type I) colloid particles is too high, such that the MFT remains above 35° C. in the absence of added plasticizer, then attempts to create a coating by drying under atmospheric pressure results in the formation of cracks and fissures which destroy the integrity of the coaing. It is believed that these cracks are a consequence of internal capillary stresses which develop when the drying water front recedes into a porous coating. It is moreover believed that these pores are a direct consequence of the inability of the polymer particles to deform into space-filing shapes during drying. Apparently, by including a suitable fraction of low $T_g$ polymer particles (Type II or III) in the dispersion, these particles can deform sufficiently to fill the pores, thereby preventing the formation of internal capillary stresses and cracks. Apparently, the minimum quantity of deformable particles required to fill the pores is about 45%. Also, in the binary blends of Example 41, the Type II component (the polymer of Example 21) has a $T_g$ of 49° C., which is about borderline for Type I polymers. Example 41 shows that, in this Example, at least 70% of the Type II (Example 21) polymer was required to avoid cracking in binary blends with the polymer Example 2. Apparently, for this particularly stiff Type II polymer, a higher fraction thereof is required to fill the pores.

A preferred example of the invention for binary blends is Example 7 (Type I), 20 to 50% by weight, blended with Example 22, 80–45% by weight.

TABLE 4

| Ex. No. | Type I (Tg), % | Type II or III (Tg), % | pH | KHN MPa | Comments |
|---|---|---|---|---|---|
| 39 | Ex. 1 (71° C.) | Ex. 18 (42° C.) | | | |
| A (Comp.) | 59 | 41 | 7.0 | 12.9 | cracks |
| B | 52 | 48 | 7.5 | 12.9 | no cracks |
| C | 48 | 52 | 7.5 | 12.5 | " |
| 40 | Ex. 2 (114° C.) | Ex. 18 (42° C.) | | | |
| A | 50 | 50 | 7 | 15.3 | no cracks |
| B | 40 | 60 | 7 | 18.3 | " |
| C | 30 | 70 | 7 | 12.2 | " |
| D | 20 | 80 | 7 | 11.1 | " |
| 41 | Ex. 2 (114° C.) | Ex. 21 (49° C.) | | | |
| A (Comp.) | 50 | 50 | 7 | 17.6 | cracks |
| B (Comp.) | 45 | 55 | 7 | 15.6 | " |
| C (Comp.) | 40 | 60 | 7 | 15.3 | " |
| D (Comp.) | 35 | 65 | 7 | 15.1 | " |
| E | 30 | 70 | 7 | 13.9 | no cracks |
| 42 | Ex. 2 (114° C.) | Ex. 22 (34° C.) | | | |
| A | 50 | 50 | 7 | 15.0 | no cracks |
| B | 45 | 55 | 7 | 14.2 | " |
| C | 40 | 60 | 7 | 13.2 | " |
| D | 35 | 65 | 7 | 13.2 | " |
| E | 30 | 70 | 7 | 11.2 | " |
| G | 25 | 75 | 7 | 10.9 | " |
| H | 20 | 80 | 7 | 10.1 | " |
| 43 | Ex. 2 (114° C.) | Ex. 35 (−1° C.) | | | |
| A (Comp.) | 60 | 40 | — | 6.6 | cracks |
| B | 50 | 50 | — | 4.3 | no cracks |
| C | 40 | 60 | — | 2.4 | " |
| D | 30 | 70 | — | 0.7 | " |
| E | 20 | 80 | — | 0.7 | " |
| 44 | Ex. 7 (90° C.) | Ex. 22 (34° C.) | | | |
| A (Comp.) | 60 | 40 | 6 | — | cracks |
| B | 55 | 45 | 6 | 12.1 | no cracks |
| C | 50 | 50 | 6 | 12.0 | " |
| D | 45 | 55 | 6 | 11.3 | " |
| E | 40 | 60 | 6 | 10.8 | " |
| F | 35 | 65 | 6 | 10.2 | " |
| G | 30 | 70 | 6 | 9.5 | " |
| H | 25 | 75 | 6 | 9.2 | " |
| I | 20 | 80 | 6 | 8.6 | " |
| 45* | Ex. 12 (90° C.) | Ex. 26 (34° C.) | | | |
| A | 23.6 | 55.0 | 8 | 10 | no cracks |
| B | 19.4 | 45.3 | 8 | 12 | " |
| 46 | Ex. 17 | Ex. 34 | | | |
| A (Comp.) | 60 | 40 | | 11.2 | cracks |
| B | 50 | 50 | | 11.2 | no cracks |
| C | 40 | 60 | | 10.0 | " |
| D | 30 | 70 | | 9.3 | " |
| E | 20 | 80 | | 7.7 | " |
| 46-1 | Ex. 17-1 (66° C.) | Ex. 34-1 (29° C.) | | | |
| A | 50 | 50 | — | 8.8 | no cracks |
| B | 40 | 60 | — | 7.4 | no cracks |
| C | 30 | 70 | — | 5.9 | no cracks |
| D | 20 | 80 | — | 4.8 | no cracks |

*Indicates samples containing white TiO$_2$ pigment (Ti-Pure ® R-902 at 6 and 11% PVC).
"Comp." indicates a Comparative Example.

EXAMPLES 47 TO 49

Examples 47–49 illustrate ternary blends between Type I, Type II, and Type III polymer (acrylic) latex dispersions, with no plasticizer. The examples, summarized in Table 5, were made by the same procedure as Example 38, except that the prescribed proportion of Type III polymer was also added. The compositions were dried at 80° C./5 minutes followed by drying at 130° C. for 20 minutes. The data illustrate variations in hardness with composition for coatings prepared without plasticizers. Again, comparative examples, indicated by "Comp." in Table 5, show that blends containing more than 55% of Type I polymer exhibited cracks.

Preferred examples of the invention for ternary blends are Example 9 (Type I)≦50% by weight blended with Example 23 (Type II), 25 to 69%, and Example 38 (Type III), 7 to 35% by weight. Note these have KHN≧5 MPa.

TABLE 5

| Ex. No. | Type I (Tg), % | Type II (Tg), % | Type III (Tg), % | pH | KHN MPa | Comments |
|---|---|---|---|---|---|---|
| 47 | Ex. 2 (114° C.) | Ex. 20 (40° C.) | Ex. 35 (−1° C.) | | | |
| A (Comp.) | 70 | 15 | 15 | 7 | — | cracks |
| B (Comp.) | 60 | 20 | 20 | 7 | — | " |
| C | 50 | 25 | 25 | 7 | 7.8 | no cracks |
| D | 40 | 30 | 30 | 7 | 7.1 | " |
| E | 30 | 35 | 35 | 7 | 5.2 | " |
| F | 20 | 40 | 40 | 7 | 3.3 | " |
| 48 | Ex. 2 (114° C.) | Ex. 21 (149° C.) | Ex. 35 (−1° C.) | | | |
| A | 50 | 25 | 25 | 7 | 8.6 | " |
| B | 45 | 27.5 | 27.5 | 7 | 6.8 | " |

TABLE 5-continued

| Ex. No. | Type I (Tg), % | Type II (Tg), % | Type III (Tg), % | pH | KHN MPa | Comments |
|---|---|---|---|---|---|---|
| C | 40 | 30 | 30 | 7 | 7.1 | " |
| D | 35 | 32.5 | 32.5 | 7 | 4.9 | " |
| E | 30 | 35 | 35 | 7 | 5.0 | " |
| 49 | Ex. 9 (82° C.) | Ex. 23 (30° C.) | Ex. 36 (−24° C.) | | | |
| A | 50 | 25 | 25 | 6 | 6.6 | " |
| B | 40 | 30 | 30 | 6 | 5.7 | " |
| C | 30 | 35 | 35 | 6 | 4.6 | " |
| D | 20 | 40 | 40 | 6 | 3.1 | " |
| E | 50 | 37.5 | 12.5 | 6 | 9.4 | " |
| F | 40 | 45 | 15 | 6 | 8.3 | " |
| G | 30 | 52.5 | 17.5 | 6 | 6.0 | " |
| H | 20 | 60 | 20 | 6 | 4.7 | " |
| I | 50 | 42.8 | 7.2 | 6 | 10.2 | " |
| J | 40 | 51.4 | 8.6 | 6 | 9.5 | " |
| K | 30 | 60 | 10 | 6 | 7.9 | " |
| L | 20 | 68.6 | 11.4 | 6 | 5.5 | " |

EXAMPLES 50–62

These Examples 50–62 illustrate correlations between mutual adherence and blend ductility, involving a comparison of failure modes for blends and corresponding laminates.

Table 6 summarizes the results of laminate-adhesion tests for various pairs of acrylic copolymers and mechanical properties of films prepared from a 50:50 blend of the corresponding dispersions. Comparative Examples, which did not fail cohesively, are indicated by "(C)" in Table 6. Blend films are characterized as ductile if the elongation at break exceeds 10%. Laminate failure is characterized as adhesive if the two films can be cleanly pealed apart without tearing, and cohesive if one or the other component tears before they can be peeled apart. Note that the distinction between ductile and brittle blends is independent of hardness (KHN). Ductility is strongly correlated with mutual adherence, i.e., blends which are ductile correspond to laminates which fail cohesively. It is likewise consistent that the laminates for Example 55 fail by a combination of cohesive and adhesive modes and the corresponding blends display elongations ranging from 8.5% to 97% depending upon blend composition (see Table 7).

TABLE 6

| Ex. No. | Type I | Type II | Type III | Laminate Failure | KHN | Blend failure |
|---|---|---|---|---|---|---|
| 50(C) | — | Ex. 30/31 | — | adhesive | 3 | brittle |
| 51(C) | Ex. 12 | Ex. 31 | — | " | 6.2 | " |
| 52(C) | Ex. 9 | Ex. 31 | — | | 7.0 | " |
| 53(C) | Ex. 12 | — | Ex. 37 | " | 3.5 | " |
| 54 | Ex. 15 | — | Ex. 37 | — | 2.8 | (marginal) |
| 55 | Ex. 16 | Ex. 31 | — | adhesive/cohesive | — | (marginal) |
| 56 | Ex. 16 | Ex. 26 | — | cohesive | 12 | ductile |
| 57 | Ex. 15 | Ex. 31 | — | — | 7 | " |
| 58 | Ex. 15 | Ex. 33 | — | — | 11.6 | " |
| 59 | Ex. 15 | Ex. 31 | — | — | 5.2 | " |
| 60 | Ex. 15 | Ex. 32 | — | — | 8.0 | " |
| 61 | Ex. 15 | — | Ex. 36 | — | 2.4 | " |
| 62 | Ex. 12 | — | Ex. 36 | — | 1.9 | " |

EXAMPLES 63–70

These Examples 63 to 70 illustrate the mechanical properties of binary blends in which butyl methacrylate is a common comonomer. Table 7 summarizes hardness and tensile properties for binary blends of poly(butyl methacrylate), a Type II homopolymer (Example 31) with two different Type I co-polymers prepared from butyl methacrylate and methyl methacrylate. The blends with Ex 15 are apparently more ductile (as reflected by greater elongation at break) than those with Example 16. This appears to correlate with increasing content of common comonomer (butyl methacrylate) in the Type I components, namely 25% in Example 16 versus 50% in Example 15.

The examples of Table 7 show that, for blends with poly(butyl methacrylate) as the Type II component, the ductility can be enhanced by increasing the content of butyl methacrylate in the Type I component. Comparative Example 63, labelled "(C)" in Table 7, represents a limiting case of marginal ductility in that the sample necks under tension but nevertheless fails at less than 10% elongation.

The mutual adherence between interfaces of immiscible polymers, which correlates with ductility of the blend, is believed to relate to the extent of molecular intermixing at the interface. Apparently, when two polymers are more nearly related in their thermodynamic properties, as for example, when they share a significant fraction of common comonomer, then such intermixing is enhanced.

TABLE 7

| Ex. No. | Type 1 | Type 2 | KHN MPa | Modulus GPA | necking % | necking MPA | tenacity MPA | elongation % |
|---|---|---|---|---|---|---|---|---|
| | Ex. 16 Wt % | Ex. 31 Wt % | | | | | | |
| 63(C) | 50 | 50 | 6.8 | 1.4 | 5 | 32 | 28 | 8.5 |
| 64 | 40 | 60 | 5.3 | 0.99 | 7 | 23 | 17 | 21 |
| 65 | 30 | 70 | 3.9 | 0.88 | 7 | 18 | 10 | 35 |
| 66 | 20 | 80 | 2.5 | 0.81 | 6 | 16 | 14 | 97 |
| | Ex. 15 Wt % | Ex. 31 Wt % | | | | | | |
| 67 | 50 | 50 | 6.3 | 1.2 | 6.5 | 26 | 16 | 45 |
| 68 | 40 | 60 | 4.4 | 1.0 | 7 | 21 | 15 | 73 |
| 69 | 30 | 70 | 3.8 | 0.81 | 6 | 18 | 16 | 127 |
| 70 | 20 | 80 | 3.4 | 0.66 | 6.5 | 15 | 13 | 131 |

EXAMPLE 71

This Example illustrates, based on the blends of Example 44. the tensile testing of bay blends. The mechanical properties of blends (Example 44) between the Type I polymer (Example 12) and the Type II polymer (Example 26) were compared with those of the pure components. (Films of pure polymer of Example 26 were prepared with the aid of a volatile plasticizer. All others were prepared by drying and annealing of the corresponding dispersions without added plasticizer.) Table 8 summarizes tensile, impact, and flexibility at ambient temperature (about 24° C.). Films of the pure Type I polymer are brittle, as exemplified by an elongation of 5% without yielding, while films of all the blends from 50 to 20% Type I polymer (44C, 44E, 44G, and 44I) were ductile (elongations>10% following yielding). This ductility is also manifest in the resistance to impact and mandrel bends. The values of Young's modulus (E) are typical of thermoplastic polymers at $T<T_g$ and is essentially independent of the blend composition. The yield stress ($\sigma_y$) increases with the content of Type I polymer. The compositions and hardness of the binary blends are given in Table 4 above. E is Young's modulus, $\sigma_y$ represents the stress maximum due to necking which occurs at elongations of about 5%. All coatings with the exception of Example 12 were cast from dispersions without plasticizer.

the mid-point between $T_g(I)$ and $T_g(II)$). At 24° C., E' is nearly independent of blend composition because both Type I and II polymers remain glassy at this temperature. For comparison, theoretical maximum and minimum values of E' (62° C.) were calculated from the values for the corresponding pure components at the same temperature according to the equations of Z. Hashin & S. Shtrikmann (J. Mech. Phys. Sol., 1963, vol 11, pp 127–140). This theory describes the minimum and maximum moduli which can be achieved from all possible isotropic structures composed of the same two component phases at a given volume fraction. For Example 4C, the experimental value of E' (62° C.) turns out to be 79% of the theoretical maximum and 79 times greater than the minimum. For Example 4I, E' (62° C.) is only 6% of the theoretical maximum and 5.6 times greater than the minimum. Such variations suggest that the Type I phase comprises a more extended or continuous structural element in E 44C than in E 44I.

Table 10 summarizes dynamic mechanical data for ternary blends of Example 8. Storage moduli for the series of ternary blends in Example 48, where the weight fractions of Type II and Type III components were maintained equal throughout, have also been exemplified in Table 10. In this series, similar to the binary blends, the value of E' at 81.5° C. (the midpoint between $T_g(I)$ and $T_g(II)$) remains greater

TABLE 8

| Example No. | % Type I | E GPa | $\sigma_y$ MPa | Elongation % | Tenacity MPa | Impact inch-lbs | Mandrel |
|---|---|---|---|---|---|---|---|
| 12 | 100 | 1.5 | n.a | 5 | 52 | — | — |
| 44C | 50 | 1.7 | 38 | 46 | 29 | 50 | <1/8" |
| 44E | 40 | 1.8 | 34 | 107 | 27 | — | — |
| 44G | 30 | 1.7 | 31 | 165 | 27 | 80 | <1/8" |
| 44I | 20 | 1.6 | 28 | 187 | 27 | — | |
| 26 | 0 | 1.0 | 26 | 294 | 26 | — | — |

EXAMPLE 72

This Example illustrates, based on the blends of Examples 44 and 48, the dynamic mechanical properties of coatings obtained from binary and ternary blends. Table 9 summarizes the dynamic storage modulus E' at a frequency of 1 Hz at 24° C. and 62° C. (The latter temperature corresponds to than 10 MPa. The value at ambient temperatures is slightly reduced relative to the binary blends due to the presence of Type III component with $T_g(III)<24°$ C. At 24° C., E' decreases with increasing content of Type III polymer because $T_g(III)=-1°$ C. However, E' (81.5° C.)>10 MPa in T-30, comparable to values for binary blends with the same content of Type I polymer (see, for example, Table 9).

TABLE 9

| Ex. No. | % Type I | $T_g(I)$ °C. | $T_g(II)$ °C. | E' (24° C.) GPa | E' (62° C.) GPa | Theory (62° C.)* min | max (GPa) |
|---|---|---|---|---|---|---|---|
| 7 | 100 | 90 | — | 2.2 | 1.4 | — | — |
| 44C | 50 | 90 | 34 | 1.9 | 0.31 | 0.0039 | 0.52 |
| 44E | 40 | 90 | 34 | 1.9 | 0.14 | 0.0030 | 0.40 |
| 44G | 30 | 90 | 34 | 1.8 | 0.038 | 0.0023 | 0.29 |
| 44I | 20 | 90 | 34 | 1.8 | 0.010 | 0.0018 | 0.18 |
| 22 | 0 | — | 34 | 1.4 | 0.0011 | — | — |

TABLE 10

| Ex. No. | % Type I | $T_g(I)$ °C. | $T_g(II)$ °C. | $T_g(III)$ °C. | E' (24° C.) GPa | E' (81.5° C.) |
|---|---|---|---|---|---|---|
| 48A | 50 | 114 | 49 | −1 | 1.1 | 0.29 |
| 48B | 45 | 114 | 49 | −1 | 1.05 | 0.20 |
| 48C | 40 | 114 | 49 | −1 | 0.74 | 0.099 |
| 48D | 35 | 114 | 49 | −1 | 0.59 | 0.047 |
| 48E | 30 | 114 | 49 | −1 | 0.54 | 0.019 |

What is claimed is:

1. An aqueous dispersion comprising a blend of polymer components each in the form of colloidal particles having average hydrodynamic radii less than 500 nm, said polymer components comprising:

a first polymer component comprising 20% to 50% by volume of the total polymeric content and exhibiting a measured $T_g(I)$ of greater than or equal to 49° C.;

a second polymer component comprising 45% to 80% by volume of the total polymeric content and exhibiting a measured $T_g(II)$ less than 49° C. and greater than 24° C.; and a third polymer component comprising 0% to 35% by volume of the total polymeric content and exhibiting a measured $T_g(III)$ less than 24° C.;

wherein each of said first, second, and third polymer components has a $M_w$ greater than 80,000 Daltons and are mutually adherent; and wherein the aqueous dispersion has a volatile organic content of less than 20% by weight of the total polymeric content.

2. The aqueous dispersion as recited in claim 1 wherein said particles have average hydrodynamic radii less than 100 nm.

3. The aqueous dispersion as recited in claim 1, wherein the measured $T_g$'s of said components reflect the effect of the addition of a non-volatile plasticizing agent.

4. The aqueous dispersion as recited in claim 1 wherein said volatile organic content is less than 10% by weight of the total polymeric content of said aqueous dispersion.

5. The aqueous dispersion as recited in claim 1, wherein, upon drying at atmospheric pressure at temperatures greater than or equal to 35° C. and annealing at temperatures greater than $T_g(I)$, a continuous, homogeneous coating is formed which is characterized by a balance of hardness, ductility and stiffness at temperatures above-$T_g(II)$, said properties represented, respectively, by KHN≧3 MPa at 24° C., tensile elongations greater than or equal to 20%, and E' (1 Hz)>10 MPa at T=$[T_g(I)+T_g(II)]/2$; and wherein said properties are achieved without, cross-linking or branching of the molecular chains of said polymeric components, during drying or annealing, such as to sensibly increase the molecular weights of said polymeric components.

6. The aqueous dispersion as recited in claim 5 wherein the hardness of said film is represented by KHN≧5 MPa.

7. The aqueous dispersion as recited in claim 1, 2, 3, 4 or 5 wherein said polymeric components are homopolymers or copolymers comprising comonomers selected from the group consisting of acrylic and methacrylic acid and the respective esters and amides thereof, acrylonitrile, styrene and its derivatives, 1,3-butadiene, isoprene, ethylene, propylene, chloroprene, vinyl acetate, vinyl choride, vinyl fluoride, and vinylidene fluoride.

8. The aqueous dispersion as recited in claim 7 wherein said polymeric components are linear or branched copolymers.

9. A paint or coating composition comprising about 10 weight % to about 50 weight % of polymeric binder solids, said binder solids comprised of about 30 weight % to about 100 weight % of the aqueous dispersion as recited in claim 1 or 5.

* * * * *